United States Patent
Fukunaga et al.

(10) Patent No.: US 9,976,007 B2
(45) Date of Patent: May 22, 2018

(54) RESIN COMPOSITE AND METHOD FOR PRODUCING RESIN COMPOSITE

(71) Applicant: SEKISUI PLASTICS CO., LTD., Osaka (JP)

(72) Inventors: Yoichiro Fukunaga, Nara (JP); Yusuke Kuwabara, Nara (JP); Kazutoshi Hitomi, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 120 days.

(21) Appl. No.: 14/771,682

(22) PCT Filed: Mar. 10, 2015

(86) PCT No.: PCT/JP2015/057026
§ 371 (c)(1),
(2) Date: Aug. 31, 2015

(87) PCT Pub. No.: WO2015/146577
PCT Pub. Date: Oct. 1, 2015

(65) Prior Publication Data
US 2016/0362533 A1    Dec. 15, 2016

(30) Foreign Application Priority Data

Mar. 27, 2014 (JP) .................. 2014-066887
Jun. 30, 2014 (JP) .................. 2014-135061

(51) Int. Cl.
*C08J 9/232* (2006.01)
*C08J 9/00* (2006.01)
(Continued)

(52) U.S. Cl.
CPC ................ *C08J 9/232* (2013.01); *B32B 3/30* (2013.01); *B32B 5/022* (2013.01); *B32B 5/024* (2013.01);
(Continued)

(58) Field of Classification Search
CPC ... C08J 9/232; C08J 9/18; C08J 9/0095; C08J 9/224; C08J 9/936; C08J 5/24; C08J 5/042; B32B 5/16; B32B 5/30; B32B 27/08
See application file for complete search history.

(56) References Cited

U.S. PATENT DOCUMENTS 5,679,450 A     10/1997  Tokoro et al.
2010/0291370 A1 11/2010  Jones
2011/0262703 A1 10/2011  Legler et al.

FOREIGN PATENT DOCUMENTS

CN    101842231    9/2010
CN    102112295    6/2011
(Continued)

OTHER PUBLICATIONS

International Preliminary Report on Patentability, along with English-language translation thereof, for PCT/JP2015/057026 dated Oct. 6, 2016.
(Continued)

*Primary Examiner* — Hai Vo
(74) *Attorney, Agent, or Firm* — Greenblum & Bernstein, P.L.C.

(57) ABSTRACT

A resin composite in which a fiber-reinforced resin material comprising fibers and a resin, and a resin expanded body are integrally laminated, wherein the resin expanded body has a hole opened at the interface with the fiber-reinforced resin material and resin of the fiber-reinforced resin material is caused to flow into the hole.

5 Claims, 4 Drawing Sheets

(51) Int. Cl.
| | |
|---|---|
| *C08J 5/04* | (2006.01) |
| *C08J 9/36* | (2006.01) |
| *C08J 5/24* | (2006.01) |
| *C08J 9/18* | (2006.01) |
| *C08J 9/224* | (2006.01) |
| *C08J 9/14* | (2006.01) |
| *C08J 9/16* | (2006.01) |
| *B32B 5/02* | (2006.01) |
| *B32B 5/16* | (2006.01) |
| *B32B 5/30* | (2006.01) |
| *B32B 27/08* | (2006.01) |
| *B32B 3/30* | (2006.01) |

(52) U.S. Cl.
CPC .............. *B32B 5/026* (2013.01); *B32B 5/16* (2013.01); *B32B 5/30* (2013.01); *B32B 27/08* (2013.01); *C08J 5/042* (2013.01); *C08J 5/24* (2013.01); *C08J 9/0066* (2013.01); *C08J 9/0095* (2013.01); *C08J 9/141* (2013.01); *C08J 9/16* (2013.01); *C08J 9/18* (2013.01); *C08J 9/224* (2013.01); *C08J 9/36* (2013.01); *B32B 2260/046* (2013.01); *B32B 2264/025* (2013.01); *B32B 2264/0257* (2013.01); *B32B 2264/0285* (2013.01); *B32B 2272/00* (2013.01); *C08J 2201/03* (2013.01); *C08J 2203/14* (2013.01); *C08J 2203/146* (2013.01); *C08J 2325/14* (2013.01); *C08J 2363/00* (2013.01); *C08J 2367/02* (2013.01)

(56) References Cited

FOREIGN PATENT DOCUMENTS

| | | |
|---|---|---|
| GB | 2 491 190 | 11/2012 |
| JP | 63-71344 | 3/1983 |
| JP | 4-4137 | 1/1992 |
| JP | 8-81576 | 3/1996 |
| JP | 9-314713 | 12/1997 |
| JP | 2006-110982 | 4/2006 |
| JP | 2011-74151 | 4/2011 |

OTHER PUBLICATIONS

Written Option of the International Searching Authority, along with English-language translation thereof, for PCT/JP2015/057026 dated Jun. 16, 2015.
Extended European Search Report in EP Appl. No. 15756540.9 dated Oct. 4, 2016.
International Search Report, with English-language translation thereof, for PCT/JP2015/057026 dated Jun. 16, 2015.
Official Action for JP 2015-047302 dated Aug. 28, 2015.
Official Action in CN Appl. No. 201580000857.6 dated Mar. 15, 2017.

RESIN COMPOSITE AND METHOD FOR PRODUCING RESIN COMPOSITE

CROSS-REFERENCE TO RELATED APPLICATIONS

The present application claims priority on Japanese Patent Application No. 2014-066887 and Japanese Patent Application No. 2014-135061, the content of which is incorporated herein by reference.

TECHNICAL FIELD

The present invention relates to a resin composite and a method for producing the resin composite.

BACKGROUND TECHNOLOGY

In recent years, demand is increasing for fiber-reinforced resin materials called FRPs or the like since such are lightweight and have high mechanical strength.

The demand for the fiber-reinforced resin materials is particularly increasing in the automobile field, the shipping field, the aviation field, and the like.

As the fiber-reinforced resin material of this type, a sheet-like material including an unsaturated polyester resin and glass fibers is widely used.

In recent years, a resin composite in which a fiber-reinforced resin material and a resin expanded body have been integrally laminated has been utilized in various uses (refer to Patent Document 1 mentioned below).

PRIOR ART DOCUMENTS

Patent Documents

Patent Document 1: Japanese Unexamined Patent Application, First Publication No. H09-314713

SUMMARY OF THE INVENTION

Problem to be Solved by the Invention

The resin expanded body forming a resin composite is normally an extrusion-expanded sheet, a bead expanded molded article, or the like.

Among these, an intricate shape can be easily obtained from a bead expanded molded article being obtainable by in-die molding expandable resin particles.

A bead expanded molded article has superior strength from being formed by a plurality of resin expanded particles that have thermally fused to each other.

Accordingly, a bead expanded molded article is suitable as a forming material of a resin composite for which superior strength is desired.

Incidentally, having superior adhesion strength between the resin expanded body and the fiber-reinforced resin material is normally desired in resin composites.

However, it is the situation that, in conventional resin composites, a method improving adhesion between the fiber-reinforced resin material and the resin expanded body is not sufficiently provided.

The present invention was achieved by focusing on this point, and has the object of providing a resin composite that can exhibit superior adhesion between the resin expanded body and the fiber-reinforced resin material, and a method for producing the same.

Means for Solving the Problem

The present invention, in order to solve the aforementioned problem, provides a resin composite in which a fiber-reinforced resin material comprising fibers and a resin, and a resin expanded body are integrally laminated, wherein the resin expanded body has a hole opened at the interface between the resin expanded body and the fiber-reinforced resin material, and the fiber-reinforced resin material and the resin expanded body are integrally laminated by causing the resin of the fiber-reinforced resin material to flow into the hole.

Also, the present invention provides a method for producing a resin composite, the method producing a resin composite in which a fiber-reinforced resin material comprising fibers and a resin, and a resin expanded body are integrally laminated, wherein the fiber-reinforced resin material is laminated on the resin expanded body, which has a hole opened on the surface, and the lamination is carried out by arranging the opening at the interface between the resin expanded body and the fiber-reinforced resin material, and the fiber-reinforced resin material and the resin expanded body are integrally laminated by causing the resin of the fiber-reinforced resin material to flow into the hole of the resin expanded body.

Effects of the Invention

The resin composite of the present invention, from having a structure like mentioned above, can exhibit superior adhesion between the resin expanded body and the fiber-reinforced resin material.

BEST MODE FOR CARRYING OUT THE INVENTION

Hereinafter, embodiments of the present invention are explained.

Firstly, the case when the resin composite is plate-like is explained with reference to FIGS. 1 and 2.

Figure 1:
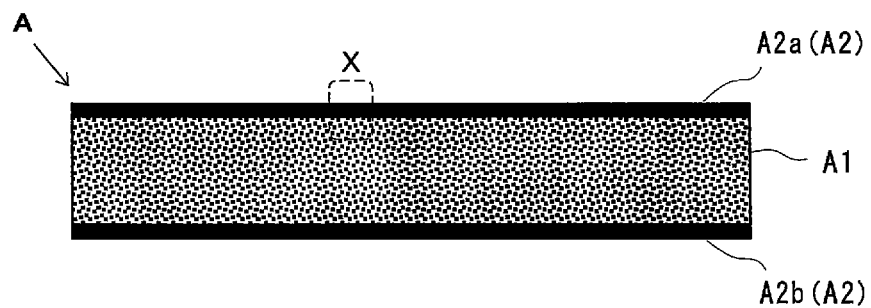
FIG. 1 is a cross-sectional view showing the resin composite of one embodiment.

FIG. 1 shows the cross-sectional structure of the resin composite of the present embodiment.

As also shown by this figure, a resin composite A of the present embodiment includes a fiber-reinforced resin layer A2 on both surfaces of a plate-like core material A1.

In addition, hereinafter, "fiber-reinforced resin layer" is also referred to as "FRP layer".

The core material A1 is a plate-like resin expanded body having a thickness smaller than the resin composite A.

The FRP layer A2 is a sheet-like fiber-reinforced resin material.

That is, the resin composite A of the present embodiment has a structure in which a resin expanded body is sandwiched between two sheet-like fiber-reinforced resin materials.

Accordingly, the resin composite A includes a first FRP layer Ata laminated on a first surface of the resin expanded body and a second FRP layer A2b laminated on a second surface, which is the surface opposite to the first surface, of the resin expanded body.

Figure 2:
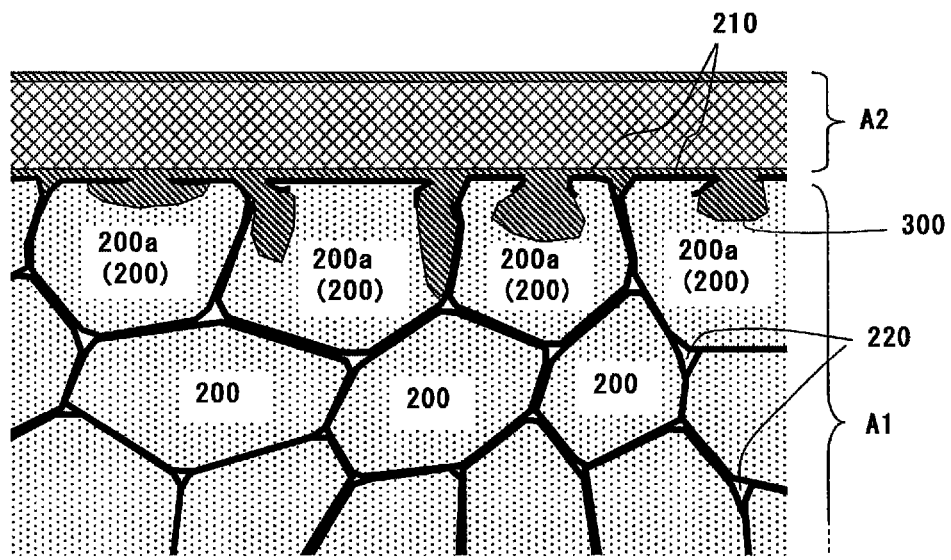
FIG. 2 is a partially enlarged cross-sectional view (enlarged view of the dashed line X section of FIG. 1) of the resin composite.

FIG. 2 schematically shows enlarged the lamination interface section between the core material A1 and the FRP layer A2 in the cross-section shown in FIG. 1.

As also shown by this figure, the resin expanded body forming the core material A1 is formed by a plurality of resin expanded particles 200 thermally fused to each other.

That is, the core material A1 of the resin composite A is a bead expanded molded article.

The resin expanded particles 200a forming the interface with the FRP layer A2 have a hole opened at the interface.

That is, the resin expanded particles 200a forming the interface with FRP layer A2 have a hole in a surface skin 210 thereof.

The resin of the fiber-reinforced resin material forming the FRP layer A2 flows into the inner area of the resin expanded particles 200a having this hole.

The resin expanded particles 200a have a lump 300 by the resin that has flowed into the inner area.

In addition, in FIG. 2, although shown simplified, the resin expanded particles 200 forming the core material A1 further have a plurality of divisions by cell membranes on the inner side of the surface skin 210 thereof, and thus actually have an inner area structure more intricate than the figure.

Accordingly, in the inner area of the resin expanded particles 200a, the lump 300 by the resin that has flowed therein becomes a more intricate shape than the state shown in the figure.

This lump 300 is connected with the FRP layer A2 through the opening of the resin expanded particles, and exhibits a high wedge effect between the core material A1 and the FRP layer A2.

The core material A1 has a void section 220 between adjoining resin expanded particles 200.

In the core material A1, void sections 220 are continuously formed in the thickness direction.

The void section 220 of the present embodiment is open at the first surface of the core material A1 on which the first FRP layer A2a is laminated.

Also, the void section 220 is open at the second surface of the core material A1 on which the second FRP layer A2b is laminated.

That is, the void section penetrates the resin expanded body from the first surface to the second surface, which is the surface opposite the first surface.

Like mentioned above, the core material A1 of the present embodiment not only has a first hole for forming the lump 300 by resin being caused to flow into the resin expanded particles, but also includes a second hole for causing the resin to flow into between the resin expanded particles through the void section 220.

The first hole easily causes the lump 300 of an intricate shape to be formed according to the inner area structure of the resin expanded particle 200.

The first hole is effective for exhibiting a high wedge effect between the core material A1 and the FRP layers A2a, A2b.

On the other hand, the second hole easily causes resin to flow deeply into the core material A1 compared to the first hole.

Then, in the resin composite of the present embodiment, the first FRP layer A2a and the second FRP layer A2b are integrally connected by the resin that has been caused to flow into the void section 220.

The resin composite has superior adhesion between the core material A1 and the FRP layer A2 by these holes.

The lump 300 of the resin in the core material normally can be formed when producing the resin composite by integrally laminating the fiber-reinforced resin material and the resin expanded body.

That is, the lump 300 can be formed by integrally laminating the resin expanded body and the fiber-reinforced resin material in the state in which the surface skin of the resin expanded particles is open at the interface with the fiber-reinforced resin material, and by integrally laminating the resin expanded body and the fiber-reinforced resin material in the state in which the resin of the fiber-reinforced resin material having fluidity.

Also, flowing of resin into the void section 220 can be carried out by the same operation.

In addition, the hole (first hole) of the resin expanded particles may be formed by a first method in which the hole is formed before laminating the FRP layer A2 on the surface of the core material A1 or may be formed by a second method in which the hole is formed when the FRP layer A2 is laminated on the surface of the core material A1.

In the case of the first method, as the method for opening in advance the surface skin 210 of the resin expanded particle 200a, for example, a mechanical method, a thermal method, a chemical method, and the like can be mentioned.

More specifically, as the mechanical method, for example, a method in which the outer surface of the bead expanded molded article used as the core material A1 is subjected to needle punching or the like so as to punch holes in the resin expanded particles can be mentioned.

Also, as the thermal method, for example, a method in which the surface of the bead expanded molded article is momentarily strongly heated to thermally fuse a part of surface skin, so as to open, can be mentioned.

Furthermore, as the chemical method, for example, a method in which an organic solvent in which the resin forming the bead expanded molded article can dissolve is coated on the surface of the bead expanded molded article to dissolve a part of the surface skin, so as to open, can be mentioned.

In the case of the second method, the hole can be formed by, for example, a method in which the surface skin 210 of the resin expanded particle 200a is pierced by the application of pressure or heat at the time of adhesion of the bead expanded molded article and the fiber-reinforced resin material.

More specifically, as a method utilizing pressure, for example, a method in which the thickness of the surface skin of the resin expanded particles in the outer surface of the bead expanded molded article is made comparatively thin by the conditions of, for example, in-die molding when forming the bead expanded molded article using the core material A1, and piercing said surface skin by strongly pressing the fiber-reinforced resin material against the bead expanded molded article when forming the FRP layer A2 can be mentioned.

Also, as a method utilizing heat, for example, a method in which the fiber-reinforced resin material is heated to a high temperature when forming the FRP layer A2 and thermally fusing the thin part of the surface skin, so as to form a hole, can be mentioned.

In addition, even in the case of forming a hole in advance in the surface skin of the resin expanded particle like the first method, it becomes easier to expand the opening area of the hole provided in advance by the fiber-reinforced resin material strongly contacting the bead expanded molded article or the fiber-reinforced resin material heated to a high temperature contacting the bead expanded molded article when forming the FRP layer A2, and thus forming the lump 300 becomes easier.

The core material and the fiber-reinforced resin material for forming the resin composite, if conventional, were in the situation that limitations were easily added to the used materials thereof from the viewpoint of mutual affinity of the resin types.

On the other hand, since the resin composite of the present embodiment is expected to exhibit superior adhesive strength between the core material A1 and the FRP layer A2 by the wedge effect by the lump 300 like mentioned above, the choices of the materials for the core material and the fiber-reinforced resin material can be increased.

Also, from the first FRP layer A2a and the second FRP layer A2b being integrally connected by the resin that has been caused to flow into the void section 220, the materials of the core material and the fiber-reinforced resin material can be freely selected for the resin composite of the present embodiment.

In addition, when forming the resin composite A in which the core material A1 and the FRP layer A2 have been integrally laminated by the bead expanded molded article and the fiber-reinforced resin material, for example, if the resin included in the fiber-reinforced resin material has ambient temperature curing properties, a method integrally laminating these under ambient temperature can be used.

However, for efficient production of the resin composite A with superior joint strength between the core material A1 and the FRP layer A2, it is preferable to integrally laminate the core material A1 and the FRP layer A2 by thermal fusion.

Accordingly, the fiber-reinforced resin material for producing the FRP layer A2 preferably contains a thermoplastic resin or a thermosetting resin.

Also, in the production of resin composite A, it is preferable to use a method in which this fiber-reinforced resin material is put in a heated state and then laminated on the bead expanded molded article.

As a method for forming the resin composite A in such form, for example:
a) a core material production step in which a plate-like bead expanded molded article, which becomes the core material A1, is prepared;
b) a hole-opening step in which the surface skin of the resin expanded particles forming the surface of the bead expanded molded article are opened;
c) a preparation step in which a preparation laminate is formed by temporarily adhering a fiber-reinforced resin material to both surfaces of the bead expanded molded article; and
d) a lamination step in which the preparation laminate is heat-pressed, and the bead expanded molded article and the fiber-reinforced resin material are thermally fused may be carried out in order.

In addition, it is not necessary to carry out the hole opening step before the preparation step like mentioned above. In short, by adjusting the way of adding pressure and heat to the preparation laminate in the lamination step, this lamination step and the hole opening step may be carried out simultaneously.

That is, forming the resin composite in which the resin has been caused to flow into the hole, may be carried out by either a step of laminating the resin expanded body having a hole opened on the surface and the fiber-reinforced resin material or a step of laminating the resin expanded body and the fiber-reinforced resin material while opening a hole on the surface of the resin expanded body by utilizing pressure when laminating the fiber-reinforced resin material on the resin expanded body.

When forming a conventional resin composite, in order to guarantee good adhesion between the core material A1 and the FRP layer A2, a fiber-reinforced resin material containing a resin amount that is more than the amount necessary to guarantee the thickness of the FRP layer A2 is used.

In other words, when forming a conventional resin composite, excess resin is supported by the fiber-reinforced resin material, so as to become a state in which the resin of the fiber-reinforced resin material melted at the time of heat-pressing sufficiently spreads over the entire surface of the resin expanded body.

Also, conventionally, this excess resin is removed in the form of overflowing from the pre-laminated article in the lamination step, and does not remain in the resin composite.

The fiber-reinforced resin material having the excess resin exhibits good adhesion to the resin expanded body since the resin has spread over the entire surface of the resin expanded body.

However, in the conventional method in which excess resin overflows, resin is wastefully consumed.

Also, the excess overflowed resin becomes a cause of increase in the trouble of cleaning by adhering to the heat-pressing machine, the die, and the like.

On the other hand, in the production method of the resin composite of the present embodiment, excess resin can be caused to flow into the resin expanded body, and thus it is possible to suppress the occurrence of overflow.

Accordingly, in the production method of the resin composite of the present embodiment, the trouble of cleaning the die and heat-pressing machine can be reduced.

In the production method of the resin composite of the present embodiment, the strength of the core material A1 near the interface with the FRP layer A2 can be improved by the resin that has been caused to flow in from the fiber-reinforced resin material.

Also, whereas conventional resin composites greatly change the material strength at the interface between the core material and the FRP layer, in the resin composite of the present embodiment, change in the material strength in the thickness direction from the FRP layer to the core material becomes inclined.

That is, the resin composite of the present embodiment becomes a greater strength than a conventional resin composite even when a bead expanded molded article and a fiber-reinforced resin material similar to the conventional resin composite is used.

To put it another way, in the production method of the present embodiment, since the strength of the core material A1 improves, even if the thickness of the FRP layer A2 is reduced compared to that which is conventional, a resin composite having equivalent strength as that which is conventional can be produced.

That is, in the production method of the present embodiment, reduction in material cost for producing the resin composite is also possible.

In addition, the core material A1, in consideration of more surely causing the resin to flow from the FRP layer side into the inner area of the resin expanded particles 200a positioned at the interface with the FRP layer A2 and the void section 220, is preferably subjected to sufficient heating when forming the FRP layer A2 by laminating a fiber-reinforced resin material like mentioned above.

Furthermore, the core material A1 preferably attains high strength by heating when forming the FRP layer A2.

Accordingly, the core material A1 preferably has a crystalline resin as a main component. The resin contained in the FRP layer A2 preferably shows moderate fluidity at the crystallization temperature of the crystalline resin which is the main component of the core material A1.

On such point, the core material A1 is preferably produced from a thermoplastic polyester-based resin.

The thermoplastic polyester resin is a high-molecular weight linear polyester obtained as a result of carrying out a condensation reaction between a dicarbonic acid and a divalent alcohol.

As the thermoplastic polyester resin, for example, an aromatic polyester resin and an aliphatic polyester resin can be mentioned.

The aromatic polyester resin is a polyester resin including an aromatic dicarbonic acid unit and a diol unit.

As the aromatic polyester resin used in forming the core material A1, for example, a polyethylene terephthalate resin, a polypropylene terephthalate resin, a polybutylene terephthalate resin, a polycyclohexane dimethylene terephthalate resin, a polyethylene naphthalate resin, a polybutylene naphthalate resin, and the like can be mentioned.

Among these, the aromatic polyester resin used in formation of the core material A1 is preferably a polyethylene terephthalate resin.

The polyethylene terephthalate resin, in a part of the diol unit thereof, may include one or more monomers selected from the group consisting of propylene glycol, 1,3-propanediol, neopentyl glycol, 1,3-butanediol, 1,4-butanediol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, diethylene glycol, triethylene glycol, and tetraethylene glycol.

In addition, the aromatic polyester resin used in formation of the core material A1 may be one type alone, or two or more types.

The aromatic polyester resin, other than having an aromatic dicarbonic acid unit and a diol unit, may contain, for example, a trivalent or higher multivalent carbonic acid such as a tricarbonic acid such as trimellitic acid and a tetracarbonic acid such as pyromellitic acid, or an anhydride thereof; a trivalent or higher multivalent alcohol such as a triol such as glycerin and a tetraol such a pentaerythritol may be contained as constitutional units.

The aromatic polyester resin may be a recycled material formed by collecting and regenerating used PET bottles and/or the like.

The aromatic polyester resin may be cross-linked by a crosslinking agent.

As the crosslinking agent, known crosslinking agents can be mentioned, and, for example, an acid dianhydride such as pyromellitic anhydride; a multi-functional epoxy compound; an oxazoline compound; an oxazine compound; and the like can be mentioned.

The crosslinking agent may be used alone, or two or more types may be combined.

As the aliphatic polyester resin, for example, a polylactic acid-based resin can be mentioned.

As the polylactic acid-based resin, a resin in which the lactic acid is polymerized by ester bonding can be used. From the viewpoints of ease of commercial acquisition and imparting expandability to the polylactic acid-based resin expanded particles, a copolymer of D-lactic acid (D body) and L-lactic acid (L body); a homopolymer of either D-lactic acid or L-lactic acid; and one or more lactide ring-opened polymers selected from the group consisting of D-lactide, L-lactide, and DL-lactide is preferable.

In addition, the aliphatic polyester resin used to form the core material A1 may be one type alone, or may be two or more types.

Also, the core material A1 may include one or more types of aromatic polyester resins and one or more types of aliphatic polyester resins.

As the synthetic resin forming the core material A1 other than the polyester-based resin, for example, a polycarbonate resin, an acrylic-based resin, a polyphenylene ether-based resin, a polymethacrylic imide resin, a polyolefin-based resin, a polystyrene-based resin, and the like can be mentioned.

As the blowing agent for expanding such resins, for example, a physical blowing agent can be mentioned.

The physical blowing agent can be, for example, a hydrocarbon such as propane, normal butane, isobutane, normal pentane, isopentane, and hexane; and halogenated compounds thereof.

Also, the physical blowing agent can be, for example, an ether such as dimethylether and an inorganic gas such as carbon dioxide and nitrogen.

In the formation of the core material A1, one physical blowing agent may be used alone, or two or more physical blowing agents may be used.

The core material A1 of the present embodiment is a bead expanded molded article in which a plurality of resin expanded particles have been thermally fused.

The thermal fusion rate of the resin expanded particles in the core material A1 is preferably 5 to 90%, more preferably 10 to 70%, and particularly preferably 15 to 60%.

A core material having such thermal fusion rate has the advantages of superior impact absorption properties and it is easy to cause the resin to flow into the void section.

The thermal fusion rate of the resin expanded particles can be measured by the following procedure.

Firstly, one arbitrary resin expanded particle, which will become the reference, in the core material A1 is specified.

The core material A1 is sliced so as to divide into 10 equal parts the resin expanded particle to become the reference (hereinafter, referred to as "reference particle") in the longest diameter direction thereof, so as to prepare 10 test pieces.

For each test piece, a cross-sectional photo with the reference particle as the center is taken at a magnification of 50 times.

The taken cross-sectional photos are imported using an image processing software and the length (S0) of the contour line of the reference particle is measured. As the image processing software, image processing software commercially available as the product name "AutoCAD LT 2005" from AutoDesk can be used.

Next, in this contour line, the length of the straight line joining both ends of the section in which the resin expanded particles are thermally fused to the reference particle and the reference particle is thermally fused is determined.

Then, the length of the straight line of all of the resin expanded particles thermally fused to the reference particle is determined, so as to calculate the sum total (S1).

The thermal fusion rate is calculated based on the below-mentioned equation and this is carried out for each test piece, so as to obtain the value of the thermal fusion rate for a total of 10 pieces.

The obtained value of the thermal fusion rate for the 10 pieces is arithmetically averaged and the average value was used as the thermal fusion rate of the reference particle.

Thermal fusion rate (%)=(S1/S0)×100

Similarly, the thermal fusion rate was calculated for 50 arbitrary reference particles, and the arithmetically averaged value of the thermal fusion rate of these reference particles was used as the thermal fusion rate of the resin expanded particles in the core material.

The apparent density of the resin expanded particles for forming the core material A1 is preferably 0.03 g/cm$^3$ or more, and more preferably 0.05 g/cm$^3$ or more.

Also, the apparent density of the resin expanded particles is preferably 0.5 g/cm$^3$ or less, and more preferably 0.3 g/cm$^3$ or less.

The apparent density of the resin expanded particles can be measured by the below-mentioned procedure.

Resin expanded particles are filled until the 1,000 cm$^3$ graduation of a measuring cylinder.

Visually observing the measuring cylinder from the horizontal direction, if even one resin expanded particle reaches the 1,000 cm$^3$ graduation, at this point in time, filling of the resin expanded particles into the measuring cylinder is finished.

Next, the mass (g) of the resin expanded particles filled in the measuring cylinder is weighed to a significant figure of two decimal places.

The apparent density of the resin expanded particles is calculated by the below-mentioned equation from the mass (W1) of the weighed resin expanded particles.

Apparent density of resin expanded particles (g/cm$^3$)=$W1/1,000$

The apparent density of the core material A1 is preferably 0.05 to 1.2 g/cm$^3$, and is more preferably 0.08 to 0.9 g/cm$^3$.

In addition, the apparent density of the core material A1 refers to the value calculated in accordance with JIS K7222 "Expanded Plastic and Rubber-Measurement of Apparent Density".

The apparent density of the core material A1 of the resin composite A can be determined by carrying out the aforementioned measurement for the core material A1 after the FRP layer A2 has been peeled from the resin composite A.

The void ratio of the core material A1 is preferably 0.1 to 50%, more preferably 0.5 to 30%, and particularly preferably 1 to 20%.

The core material A1 having such void ratio exhibits superior adhesion between the FRP layers A2 by the resin that has been caused to flow into the void section.

Also, the core material A1 having such void ratio can exhibit superior strength in the resin composite.

In addition, the void ratio of the core material A1 can be measured by the below-mentioned procedure.

Firstly, the apparent volume (V1) of the core material A1 is measured.

Next, the core material A1 is completely immersed in water and the increased volume (V2) by immersing said core material A1 in water is measured.

Then, the void ratio of the core material A1 is calculated based on the below-mentioned equation.

Void ratio of core material $A1(\%)=[(V1-V2)/V1]\times 100$

The fiber-reinforced resin material forming together with the core material A1 like mentioned above the resin composite includes a resin and fibers.

As the fibers, inorganic fibers such as metal fibers, glass fibers, carbon fibers, silicon carbide fibers, alumina fibers, titanium fibers, basalt fibers, and ceramic fibers; organic fibers such as aramid fibers, polyethylene fibers, polyparaphenylene benzoxadole (PBO) fibers; boron fibers; and the like can be mentioned.

The fiber-reinforced resin may include one type of fibers or may include two or more types of fibers.

The fiber-reinforced resin material of the present embodiment preferably contains any of carbon fibers, glass fibers, and aramid fibers, and a fiber-reinforced resin material containing carbon fibers is preferable.

The fibers are preferably contained in the fiber-reinforced resin material in the state of a base material sheet.

As the base material sheet, a woven material, a knitted material, a nonwoven fabric, and the like using the aforementioned fibers can be mentioned.

In addition, as the woven material, for example, a woven material formed by plain weave, twill weave, satin weave, or the like can be mentioned.

Also, the base material sheet may be that which is sheet-like by aligning fibers in one direction (unidirectional fiber).

The FRP layer A2 can be formed by a sheet body in which a resin has been impregnated into the aforementioned base material sheet.

The resin used in the formation of the aforementioned FRP layer A2 can be a thermosetting resin or a thermoplastic resin.

As the thermosetting resin, for example, an epoxy resin, an unsaturated polyester resin, a phenol resin, a melamine resin, a polyurethane resin, a silicone resin, a maleimide resin, a vinyl ester resin, a cyanic acid ester resin, and the like can be mentioned.

Also, as the thermosetting resin, for example, a prepolymerized resin of a maleimide resin and a cyanic acid ester resin, and the like can be mentioned.

The thermosetting resin used in the formation of the FRP layer A2, from having superior heat resistance, impact absorption properties, and chemical resistance, is preferably an epoxy resin or a vinyl ester resin.

In addition, the FRP layer A2 may contain only one type of thermosetting resin or may contain two or more types of thermosetting resins.

As the thermoplastic resin used in the formation of the FRP layer A2, for example, a polyolefin-based resin, a polyester-based resin, a thermoplastic epoxy resin, an amide-based resin, a thermoplastic polyurethane resin, a sulfide-based resin, and acrylic-based resin, and the like can be mentioned.

In addition, the FRP layer A2 may contain only one type of thermoplastic resin or may contain two or more types of thermoplastic resins.

Also, the FRP layer A2 may contain one or more thermoplastic resins and one or more thermosetting resins.

As the epoxy resin, for example, a bisphenol A-type epoxy resin, a bisphenol fluorene-type epoxy resin, a cresol novolak-type epoxy resin, a phenol novolak-type epoxy resin, a cyclic aliphatic-type epoxy resin, a long-chain aliphatic-type epoxy resin, a glycidyl ester-type epoxy resin, a glycidyl amine-type epoxy resin, and the like can be mentioned.

As the epoxy resin contained in the FRP layer A2, a bisphenol A-type epoxy resin or a bisphenol fluorene-type epoxy resin is preferable.

As the polyurethane resin, for example, a polymer having a long-chain structure obtained by polymerizing a diol and a diisocyanate can be mentioned.

As the diol constituting the polyurethane resin, for example, ethylene glycol, diethylene glycol, propylene glycol, dipropylene glycol, 1,3-butanediol, 1,4-butanediol, and the like can be mentioned.

As the diisocyanate constituting the polyurethane resin, for example, an aromatic diisocyanate, an aliphatic diisocyanate, and an alicyclic disocyanate can be mentioned.

The polyurethane resin may contain two or more types of diols and diisocyanates respectively.

The content of the resin in the FRP layer A2 is preferably 20 to 70% by mass, and more preferably 30 to 60% by mass.

If the FRP layer A2 has the aforementioned resin content, adhesion between fibers and adhesion with the core material are superior, and becomes an FRP layer having superior mechanical strength.

The thickness of the FRP layer A2 is preferably 0.02 to 5 mm, and more preferably 0.05 to 1 mm.

By the FRP layer A2 having the aforementioned thickness, a resin composite that is lightweight and has superior mechanical strength can be made.

The weight per area of the FRP layer A2 is preferably 50 to 4,000 g/m$^2$, and more preferably 100 to 1,000 g/m$^2$.

By the FRP layer A2 having the aforementioned weight per area, a resin composite that is lightweight and has superior mechanical strength can be made.

In the resin composite A of the present embodiment, it is not necessary for the fiber-reinforced resin material forming the FRP layer A2a on one surface side of the core material A1 and the fiber-reinforced resin forming the FRP layer A2b on the other surface side of the core material A1 to be the same, and these may be different.

When forming the FRP layer A2 by the aforementioned fiber-reinforced resin material, the amount of resin that is caused to flow into the void section 220 of the aforementioned core material A1 is preferably large.

The proportion of all the void sections accounted for by void sections in which the resin has flowed into is preferably 50% or more, more preferably 80% or more, and particularly preferably 100%.

The proportion of void sections 220 in which the resin has flowed into can be measured by the below-mentioned procedure.

Firstly, one arbitrary resin expanded particle (reference particle), which will become the reference, in the core material A1 is specified.

The core material A1 is sliced so as to divide into 10 equal parts the resin expanded particle to become the reference in the longest diameter direction thereof, so as to prepare 10 test pieces.

For each test piece, a cross-sectional photo with the reference particle as the center is taken at a magnification of 50 times.

The taken cross-sectional photos are imported using an image processing software and the longest diameter of the reference particle is measured. As the image processing software, image processing software commercially available as the product name "AutoCAD LT 2005" from AutoDesk can be used.

Subsequently, the reference particle is enclosed by a square having this longest diameter as the length of one side.

Then, within the square, the total area (S3) of the void sections, including the portion in which the resin has filled, is measured.

Also, within the square, the total area (S2) of void sections in which the resin has filled is measured.

Then, the resin filling ratio is calculated based on the below-mentioned equation, and this is carried out for each test piece, so as to obtain the value of the resin filling ratio for a total of 10 pieces.

The obtained value of the resin filling ratio for the 10 pieces is arithmetically averaged, so as to obtain the average value.

Resin filling ratio (%)=(S2/S3)×100

The thermal fusion rate is calculated based on the below-mentioned equation, and this is carried out for each test piece so as to obtain the value of the thermal fusion rate for a total of 10 pieces.

Similarly, the resin filling ratio was calculated for 50 arbitrary reference particles, and the arithmetically averaged value of the resin filling ratio of these 50 reference particles was used as the proportion of all the void sections accounted for by the void sections in which the resin has flowed into.

Also, in the core material A1, the proportion of resin expanded particles in which the resin has flowed into among all of the resin expanded particles forming the interface with the FRP layer A2 is preferably 10% or more and 50% or less, and more preferably 15% or more and 30% or less.

By the resin expanded particles in which the resin has flowed into existing in the aforementioned proportion at the interface with the FRP layer A2 in the core material A1, superior lightweight properties and mechanical strength can be exhibited by the resin composite.

The proportion of resin expanded particles in which the resin has flowed into can be measured by the below-mentioned procedure.

Firstly, the resin composite is sliced horizontally with the interface at a position a little more on the core side than the interface between the FRP layer A2 and the core material A1, and the FRP layer is removed.

The slice surface of the core material A1 from which the FRP layer A2 has been removed is observed, and the number of resin expanded particles is randomly set in a range to become about from 100 to 200.

The number of all of the resin expanded particles in this range (N0) and the number of resin expanded particles in which the resin has flowed into among such (N1) are measured.

Then, the proportion of resin expanded particles in which the resin has flowed into can be determined based on the below-mentioned equation.

Proportion of resin expanded particles in which the resin has flowed into (%)=(N1/N0)×100

Similarly, the proportion of resin expanded particles in which the resin has flowed into is determined for 50 arbitrary points, and the obtained value is averaged.

Then, this average value is used as the proportion of resin expanded particles in which the resin has flowed into in the resin composite.

The resin composite of the present embodiment, from having superior lightweight properties and strength, is suitable for the formation of automobile monococks, frames, roofs, bonnets, fenders, undercovers, trunk lids, floor panels, dash lowers, pillars, crash boxes, cross members, side members, side sills, seat sheets, and installment panels.

In addition, the resin composite A of the present embodiment can be used in various forms other than the aforementioned exemplified form.

That is, although specific resins are exemplified for the materials of the resin expanded body and the fiber-reinforced resin material in the description above, the resin expanded body and the fiber-reinforced resin material of the present invention may be formed by any resin.

Also, although a bead expanded molded article is exemplified as the resin expanded body in the description above, the resin expanded body is not limited to a bead expanded molded article in the present invention.

That is, the resin expanded body used in the present invention may also be an expanded sheet that has been extrusion expanded into a sheet by a circular die or a flat die.

Also, the resin expanded body used in the present invention may be an expanded board that has been extrusion molded into a board shape through a sizing die.

Furthermore, the resin expanded body used in the present invention may be, for example, an expanded molded article formed by in-die expansion of a lump-like object including a blowing agent.

Also, the resin composite A of the present embodiment is not limited to a flat plate-like resin composite liked shown in FIG. 1 and the like, and may be formed into an intricate shape.

Figure 3:
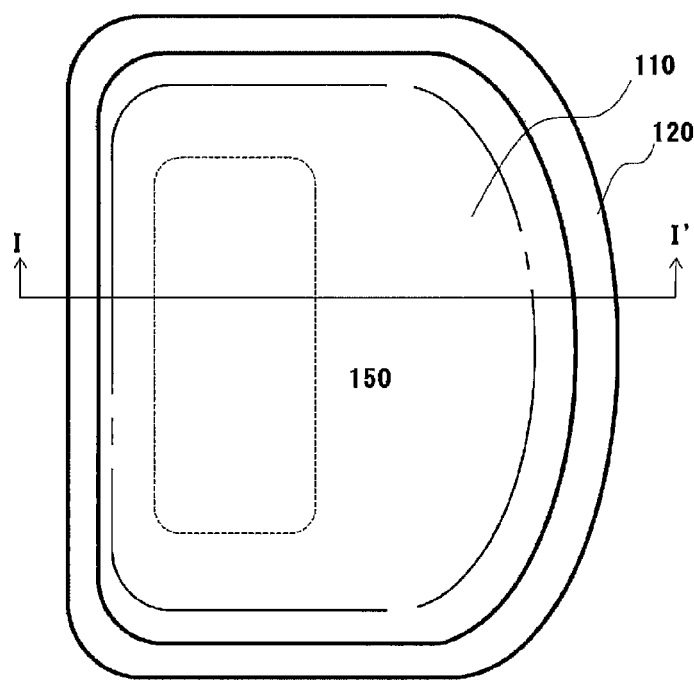
FIG. 3 is a planar view (top view) showing the resin composite of another embodiment.
Figure 4:
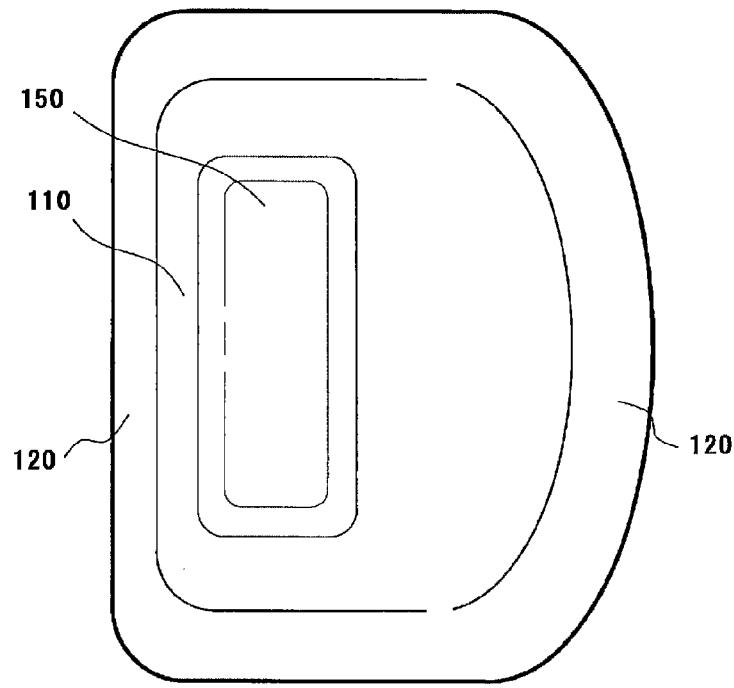
FIG. 4 is a planar view (bottom view) showing the resin composite of another embodiment.
Figure 5:
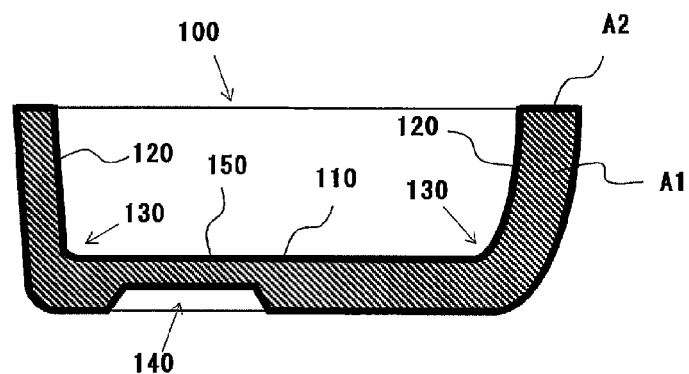
FIG. 5 is a cross-sectional view (cross-sectional view taken in the arrow direction along the line I-I' of FIG. 3) showing the resin composite of another embodiment.

For example, the resin composite A of the present embodiment may be, for example, like those exemplified in FIGS. 3 to 5.

The resin composite A, like shown in FIG. 3, has a contour shape in planar view (top surface view) of a roughly vertically long rectangular shape.

More specifically, the resin composite A is a shape in which the entire contour shape is the alphabet capital letter "D" in which the contour shape on the left side of the front view in FIG. 3 is straight while the contour shape on the right side of the front view has a slightly bulging shape in the outer direction (right side).

The resin composite A is recessed other than on the outer edge section in planar view. As shown in FIG. 5, the resin composite A includes a bottom surface section 110 forming a bottom surface of a recessed section 100 and a side wall section 120 forming a side wall rising up from the outer edge of the bottom surface, and is formed into a tray-like shape as a whole.

In this bottom surface section 110, as shown in FIG. 4 showing the state of the bottom surface of the resin composite A, a second recessed section 140 in the opposite direction to the recessed direction of the recess section 100 is formed so as to form a thin wall section 150.

Even in a resin composite have such an intricate shape, the core material has a hole open at the surface skin of the resin expanded particles forming the interface with the fiber-reinforced resin material, and is the same as the plate-like resin composite exemplified in FIG. 1 on the point that superior effects are exhibited when the resin of the fiber-reinforced resin material has been caused to flow into the inner area of the resin expanded particles.

In addition, the present invention is naturally not limited to such exemplifications.

EXAMPLES

Although the present invention is further explained below by way of examples, the present invention is not limited by these examples.

Examples 1, 2, and 6

<Production of Expandable Resin Particles>

A modified polyethylene terephthalate composition including the following (1a) to (1c) was supplied to a uniaxial extruder having a caliber of 65 mm and an L/D ratio of 35, and melt kneaded at 290° C.

(1a) 100 parts by mass of a modified polyethylene terephthalate including 1,4-cyclohexanedimethanol in a part of the diol unit (modified PET, manufactured by Eastman, product name: "EN099", melting point: 238.5° C., glass transition temperature $T_g$: 75.6° C.)

(1b) 1.8 parts by mass of a master batch in which talc is contained in polyethylene terephthalate (polyethylene terephthalate content: 60% by mass, talc content: 40% by mass)

(1c) 0.26 parts by mass of pyromellitic anhydride

Next, from partway in the uniaxial extruder, butane including 35% by mass of isobutane and 65% by mass of normal butane was injected under pressure into a molten state modified polyethylene terephthalate composition so as to become the amounts shown in Table 1 with respect to a total amount of the modified polyethylene terephthalate and the polyethylene terephthalate of 100 parts by mass, and were uniformly dispersed in the modified polyethylene terephthalate composition.

Thereafter, in the front end section of the extruder, after cooling the molten state modified polyethylene terephthalate composition to 280° C., the modified polyethylene terephthalate composition was extruded from the nozzles of a multi-nozzle die attached to the front end of the extruder.

A multi-nozzle die having nozzles with an outlet section diameter of 1 mm was used as the multi-nozzle die.

Then, the extrudate expanded by extruding from the outlet section of the nozzle of the multi-nozzle die was directly cooled after cutting by a rotary cutter to produce roughly spherical expandable resin particles.

The extrudate was an extrudate having an unexpanded section directly after being extruded from the nozzle of the multi-nozzle die and an expanded section partway through expansion continuous with this unexpanded section.

The expandable resin particles were produced by cutting the extrudate at the unexpanded section.

The bulk density of the expandable resin particles is as shown in Table 1.

<Production of Core Material>

When die-clamping, a male die and a female die formed by a cuboid-shaped cavity (300 mm length×400 mm width×50 mm height) were prepared.

The dies were mounted on a molding machine.

The expandable resin particles were filled in the dies mounted on the molding machine and die-clamped.

Thereafter, the expandable resin particles in the dies were heated by a one side heating operation in which steam was introduced into the cavity from either the male die or the female die and made to pass through the other die.

In addition, the heating time and the gauge pressure of steam (107° C.) in the one side heating operation are as shown in Table 1.

Next, the expandable resin particles were heated by a both-surface heating operation in which steam was introduced into the cavity from both dies.

The heating time and the gauge pressure of steam (107° C.) in the both-surface heating operation are as shown in Table 1.

Then, the expandable resin particles were expanded in the both-surface heating operation and the obtained resin expanded particles were integrated through thermal fusion by the expanding power thereof.

Thereafter, the supply of steam was stopped and a keep warm operation in which the dies are allowed to cool for 3 seconds was carried out.

After the keep warm operation, the dies were cooled until ambient temperature and the bead expanded molded article was removed.

The void ratio and apparent density of the obtained bead expanded molded article, and the thermal fusion rate of the expanded particles are shown in Table 1

The closed cell ratio and the apparent density of the resin expanded particles forming the obtained bead expanded molded article are shown in Table 1.

In the obtained core material, the resin expanded particles were integrated by direct thermal fusion (surface skin layers integrated by thermal fusion) of resin expanded particles.

Also, the core material had a void section between mutually adjacent resin expanded particles.

Furthermore, the core material had a mesh pattern extending over the entirety of the core material by the void sections of the core material being connected to each other.

Also, the void sections penetrate in the thickness direction of the core material, and were open on one surface side and the other surface side of the core material.

<Production of Resin Composite: RTM Method>

8 base material sheets in which carbon fibers are weaved (manufactured by Mitsubishi Rayon Co., Ltd., product name: Pilofil TR3523M, weight per area: 200 g/m², thickness: 0.23 mm) were prepared.

4 of these material sheets were overlapped, so as to prepare two laminated sheets.

In the production of the resin composite, a rectangular laminated sheet of 300 mm length×400 mm width was used.

In addition, the laminated sheets were prepared by overlapping the base material sheet so that the warp direction from below in order becomes 45°, −45°, 0°, and 90°.

Regarding the warp direction, with the warp direction of the second base material sheet from the top as a reference, the clockwise direction is represented as +(plus) and the counter clockwise direction is represented as − (minus).

A laminate was prepared by laminating a laminated sheet on both surfaces in the thickness direction of the core material (lamination step).

At this time, the two laminated sheets are laminated on the core material so that the material sheet in which the warp direction is 90° becomes the outermost side.

Also, the two laminated sheets are laminated on the core material so as to become a state in which the warp length directions of reinforced fiber base material on the outermost side are arranged orthogonal to each other.

Figure 6:
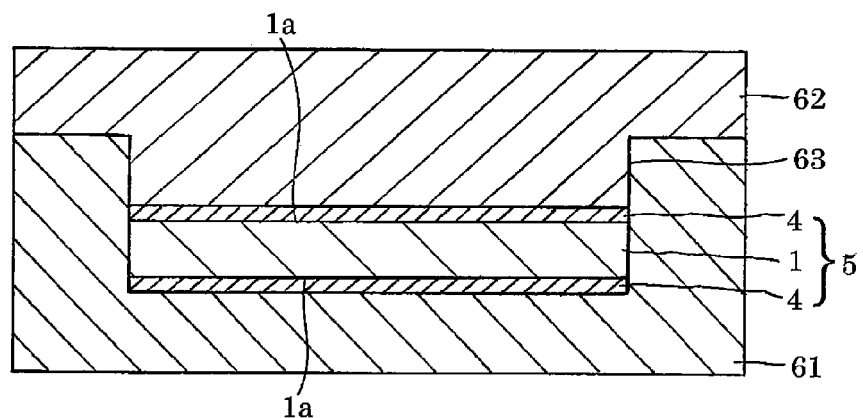
FIG. 6 is a schematic cross-sectional view showing one example of the production procedure of a resin composite.

Next, as shown in FIG. 6, after supplying a laminate 5 inside dies 61, 62, the dies 61, 62 were die-clamped, and then the dies 61, 62 were heated to 60° C.

On the other hand, an epoxy resin ("DxENATOOL XNR 6809" manufactured by Nagase ChemteX Corporation, glass transition temperature $T_g$: 65.0° C.) heated to 60° C. was prepared.

The molten state 60° C. epoxy resin was supplied into a cavity 63 of the dies 61, 62 through a resin supply channel (not shown) at an injection pressure of 0.2 MPa and the epoxy resin was impregnated into laminated sheets 4, 4 to form FRP layers, and the epoxy resin was caused to flow into the void sections of a core material 1 so that the void sections were filled with the epoxy resin (filling step).

Using a vacuum pump, a part of the epoxy resin supplied into the cavity was discharge outside the cavity and inside the cavity was made a reduced pressure state.

Next, the dies 61, 62 were heated to 120° C. and held thereat for 90 minutes to cure the epoxy resin in the cavity.

Thereafter, the dies 61, 62 were cooled to 30° C., an FRP layer was laminated on both surfaces of the core material, and a resin composite was produced in which the two FRP layers are connected in the core material by the epoxy resin filled in the void sections in the core material (integration step).

The epoxy resin was impregnated into the FRP layers of the resin composite only in the amount shown in Table 1.

The thickness and weight per area of each FRP layer of the resin composite is as shown in Table 1.

Examples 3 and 4

Other than supplying to the uniaxial extruder a styrene-methyl methacrylate-maleic anhydride copolymer composition comprising the following (2a) to (2d) instead of the modified polyethylene terephthalate composition, and changing the amount of butane supplied to the uniaxial extruder and heating conditions of the one side heating operation and the both-surface heating operation when in-die expansion molding as shown in Table 1, a fiber-reinforced composite A was produced in the same manner as Example 1.

(2a) 100 parts by mass of a styrene-methyl methacrylate-maleic anhydride copolymer (styrene unit: 45.9% by mass, methyl methacrylate unit: 21.5% by mass, maleic anhydride copolymer: 32.6% by mass, manufactured by Denki Kagaku Kogyo Kabushiki Kaisha, product name "RESISFY R200", glass transition temperature $T_g$: 140.7° C.)

(2b) 1.8 parts by mass of a master batch (content of styrene-methyl methacrylate-maleic anhydride copolymer: 60% by mass, talc content: 40% by mass) in which talc is contained in styrene-methyl methacrylate-maleic anhydride copolymer (styrene unit: 45.9% by mass, methyl methacrylate unit: 21.5% by mass, (2c) maleic anhydride copolymer: 32.6% by mass, manufactured by Denki Kagaku Kogyo Kabushiki Kaisha, product name "RESISFY R200", glass transition temperature $T_g$: 140.7° C.)

(2d) 0.26 parts by mass of pyromellitic anhydride

The thickness, weight per area, and epoxy resin amount of the FRP layers of the prepared resin composite are as shown in Table 1.

In addition, in Table 1, the styrene-methyl methacrylate-maleic anhydride copolymer is notated as simply "acrylic copolymer".

Example 5

<Production of Core Material>

A core material was produced by the same procedure as Example 1.

<Production of Resin Composite: Autoclave Method>

8 sheet materials in which an uncured epoxy resin is impregnated into a reinforced fiber base material in which carbon fibers are weaved (manufactured by Mitsubishi Rayon Co., Ltd., product name: Pilofil Prepeg TR3523M 381GMX, weight per area: 200 g/m², thickness: 0.23 mm, epoxy resin glass transition temperature $T_g$: 121° C.) were prepared.

The content of the epoxy resin in the sheet materials was 40% by mass.

4 of these sheets were overlapped so as to prepare two laminated sheets.

The warp angle of the sheet materials in these laminated sheets were made the same as Example 1.

That is, the warp directions of the 4 sheet materials in the laminated sheet were 45°, −45°, 0°, and 90°.

It is the same as Example 1 on the point of the laminated sheets were produced as a rectangular laminated sheet of 300 mm length×400 mm width.

Next, an aluminum plate was prepared, a mold release agent (manufactured by Chemlease Japan, product name: "Chemlease 2166" was coated on the top surface of this aluminum plate, and this was left to stand for 1 day to subject the top surface of the aluminum plate to a mold release treatment.

In addition, the peripheral edge of the top surface of the aluminum plate, since a below-mentioned sealing material 10a and a vac valve 10b are arranged thereon, was not subjected to the mold release treatment.

Figure 7:
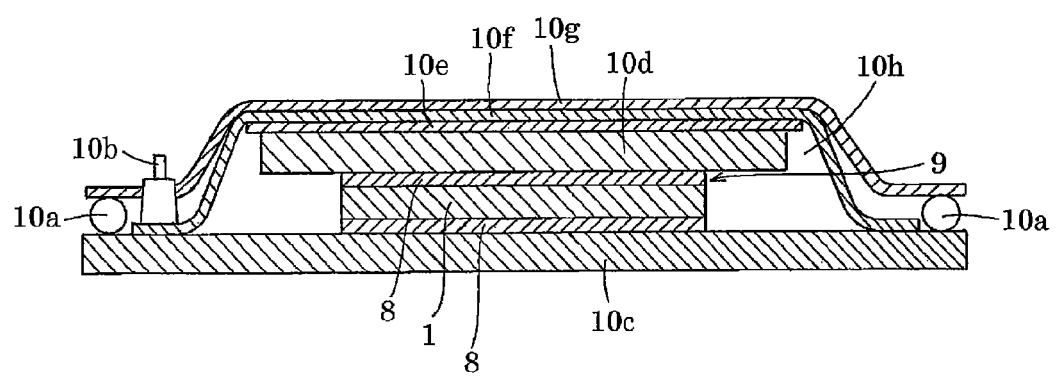
FIG. 7 is a schematic cross-sectional view showing another example of the production procedure of a resin composite.

Using the aluminum plate of which the top surface has been subjected to a mold release treatment as a pressing member 10c, as shown in FIG. 7, a laminate 9 was mounted on the top surface, which has been subjected to a mold release treatment, of the pressing member 10c.

Next, similar to that mentioned above, using an aluminum plate of which the bottom surface has been subjected to a mold release treatment as a pressing member 10d, the pressing member 10d was laminated on the laminate 9. At this time, the surface that has been subjected to a mold release treatment of the pressing member 10d was made to contact with the laminate 9.

Thereafter, a release film 10e (manufactured by AIRTECH, product name: "WL5200B-P") having a through hole and a breather cloth 10f (manufactured by AIRTECH, product name "AIRWEAVE N4") were laminated on the pressing member 10d, so as to entirely cover the pressing member 10d.

As the release film 10e, a release film formed from a tetrafluoroethylene-ethylene copolymer film was used.

Also, as the release film 10e, a release film having a plurality of through holes penetrating between both surfaces and for which passing through of the epoxy resin in the laminated sheet is possible was used.

As the breather cloth 10f, a breather cloth that is formed from a polyester nonwoven fabric and into which the epoxy resin can be impregnated was used.

A bagging film 10g (manufactured by AIRTECH, product name: "WL7400") was made to cover the top of the breather cloth 10f, and between the peripheral edge section of the bagging film 10g and the pressing member 10c opposing this was connected using a sealing material 10a (sealant tape manufactured by AIRTECH, product name: "GS43MR").

Then, the laminate 9 was sealed by the bagging film 10g to produce a laminate structure for a press.

In addition, as the bagging film 10g, a bagging film that was formed from a nylon film and for which a vac valve 10b (manufactured by AIRTECH, product name: "VAC VALVE 402A") is arranged on a part thereof was used.

Next, the laminate structure was supplied to the inside of an autoclave, the vac valve 10b of the laminate structure was connected to a vacuum line, and the space section 10h sealed by the bagging film 10g was depressurized to a vacuum degree of 0.10 MPa.

In addition, the pressure reduction of a space section 10h was also continued to be carried out thereafter.

Thereafter, the laminate 9 was heated so that the surface temperature thereof became 90° C., so as to melt the epoxy resin in the laminated sheet, and the molten state epoxy resin was exuded to fill the void sections of the core material (filling step).

At this time, excess epoxy resin was sequentially discharged to the outside through the space section 10h.

Next, the laminate 9 was heated to 130° C. and held thereat for 90 minutes, and a pressure of 0.3 MPa was added to the laminate 9 in the thickness direction of the core material 1.

Then, the epoxy resin was cured by the heating.

Thereafter, the laminate 9 was cooled to 30° C., an FRP layer was laminated on both surfaces of the core material, and a resin composite was produced in which the two FRP layers are connected in the core material by the epoxy resin filled in the void sections in the core material (integration step).

Only the amount of epoxy resin shown in Table 1 was impregnated into the FRP layers of the resin composite.

The thickness and weight per area of each FRP layer of the resin composite are as shown in Table 1.

Comparative Example 1

Other than changing the heating conditions of the one side heating operation and the both-surface heating operation at the time of core material production as shown in Table 1, a resin composite was produced in the same manner as Example 6.

In addition, if the heating time at the time of production of the core material (total time of the one side heating operation and the both-surface heating operation) is even a little shorter, gaps between the resin expanded particles of the obtained core material occur and a partial void section formed in the inner area.

Comparative Example 2

Other than changing the heating conditions of the one side heating operation and the both-surface heating operation at the time of core material production as shown in Table 1, a resin composite was produced in the same manner as Example 3.

Comparative Example 3

A powder bisphenol A-type epoxy resin (manufactured by DIC, product name: "EPICLON-4050", glass transition temperature $T_g$: 56.5° C., density: 1.20 g/cm³) was pulverized using a mortar to produce an epoxy resin having an average particle diameter of 0.1 mm.

Expandable resin particles were produced by the same procedure as Example 6.

100 parts by mass of the expandable resin particles and 0.5 parts by mass of the epoxy powder were inserted into the same bag and mixed, and the epoxy powder uniformly adhered to the surface of the expandable resin particles by static electricity.

All of the epoxy resin supplied to the bag adhered to the surface of the expandable resin particles.

Other than using these expandable particles to which the epoxy resin has adhered, a core material was produced in the same manner as Example 6.

The void ratio and apparent density of the obtained core material, and thermal fusion rate of the resin expanded particles are shown in Table 1.

The closed cell ratio and the apparent density of the resin expanded particles forming the obtained core material are shown in Table 1.

All of the resin expanded particles forming the obtained core material were indirectly integrated by thermal fusion via the epoxy resin.

A gap formed between mutually adjacent resin expanded particles in the core material, and by the connection and communication of these gaps, void sections formed in a three-dimensionally mesh-like extended state in the entire core material.

The void sections in the core material penetrated between both surfaces in the thickness direction of the core material.

The void sections were open at both surfaces in the thickness direction of the core material.

The filling ratio of the epoxy resin of the obtained resin composite was measured by the aforementioned procedure and the impact absorption properties of the obtained resin composite were measured by the below-mentioned procedure, and the results are shown in Table 1.

(Impact Absorption Properties)

The impact absorption properties in an impact rupture test of the resin composite was measured in accordance with the method specified in ASTM D-3763.

Specifically, the impact absorption properties of the resin composite using the FRP layer as the impact surface were measured by the below-mentioned measurement conditions and evaluated based on the below-mentioned standard.

(Measurement Standard)
A: Only the top side FRP layer was penetrated.
B: Only the top side FRP layer and the expanded molded article were penetrated.
C: The top and bottom FRP layers and the expanded molded article were all penetrated.

(Measurement Conditions)
Measurement device: product name: "Dynatap GRC8250", manufactured by General Research Corporation
Sample dimensions: 100 mm×100 mm
Span: 3-inch circular hole
Measurement temperature: 20° C.
Weight of falling weight: 3.17 kg
Tap tip R: 0.5 inches
Impact speed: 4.0 m/sec

TABLE 1

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
|  | Butane (parts by mass) | 0.8 | 1 | 1 | 1.4 | 0.8 | 1 | 1 | 1 | 0.8 |
|  | Bulk density of expandable resin particles (g/cm$^3$) | 0.27 | 0.14 | 0.1 | 0.04 | 0.27 | 0.14 | 0.14 | 0.1 | 0.14 |
| One side heating | Gauge pressure (MPa) | 0.03 | 0.03 | 0.3 | 0.3 | 0.03 | 0.03 | 0.03 | 0.3 | 0.03 |
|  | Heating time (sec) | 15 | 15 | 15 | 10 | 15 | 6 | 30 | 20 | 30 |
| Both-surface heating | Gauge pressure (MPa) | 0.03 | 0.03 | 0.3 | 0.3 | 0.03 | 0.03 | 0.03 | 0.3 | 0.03 |
|  | Heating time (sec) | 15 | 15 | 15 | 10 | 15 | 6 | 30 | 20 | 30 |
| Core material | Resin | Modified PET | Modified PET | Acrylic copolymer | Acrylic copolymer | Modified PET | Modified PET | Modified PET | Acrylic copolymer | Modified PET |
|  | Thermal fusion rate (%) | 30 | 20 | 35 | 40 | 30 | 10 | 100 | 100 | 40 |
|  | Thermal fusion form | Direct | Direct | Direct | Direct | Direct | Direct | Direct | Direct | Indirect |
|  | Apparent density of resin expanded particles (g/cm$^3$) | 0.25 | 0.13 | 0.09 | 0.03 | 0.25 | 0.13 | 0.11 | 0.08 | 0.13 |
|  | Void ratio (%) | 5 | 29 | 3 | 30 | 5 | 40 | 0 | 0 | 5 |
|  | Apparent density (g/cm$^3$) | 0.24 | 0.09 | 0.09 | 0.02 | 0.24 | 0.08 | 0.11 | 0.08 | 0.12 |
| Fiber-reinforced resin material | Fibers (CF: Carbon fibers) | CF | CF | CF | CF | CF | CF | CF | CF | CF |
|  | Resin (EPX: Epoxy resin) | EPX | EPX | EPX | EPX | EPX | EPX | EPX | EPX | EPX |
| Resin composite | Production Method | RTM | RTM | RTM | RTM | Autoclave | RTM | RTM | RTM | RTM |
|  | Epoxy content of FRP layers (% by mass) | 45 | 45 | 45 | 45 | 35 | 45 | 45 | 45 | 45 |
|  | Thickness of FRP layer (mm) | 1 | 1 | 1 | 1 | 1 | 1 | 1 | 1 | 1 |
|  | Weight per area of FRP layer (g/m$^2$) | 800 | 800 | 800 | 800 | 800 | 800 | 800 | 800 | 800 |
|  | Resin filling ratio of void sections (%) | 95 | 95 | 90 | 95 | 90 | 85 | 0 | 0 | 80 |
|  | Impact absorption properties | A | B | B | B | A | B | C | C | C |

However, the openings were blocked by a molten material in which the epoxy powder has melted, and was in a state in which no more resin can flow in.

Using this core material, a resin composite was produced in the same manner as Example 6.

In the aforementioned examples, resin composites were produced using a resin expanded body having a hole open on the surface as the core material.

Separate to this, utilizing the pressure when laminating a fiber-reinforced resin material on a resin expanded body, a resin composite was produced by, while opening a hole on the surface of the resin expanded body, laminating the resin expanded body and the fiber-reinforced resin material.

The fiber-reinforced resin material (FRP layer A2) was peeled from this resin composite and the state of the lamination interface between the FRP layer A2 and the core material A1 was photographed.

Figure 8:
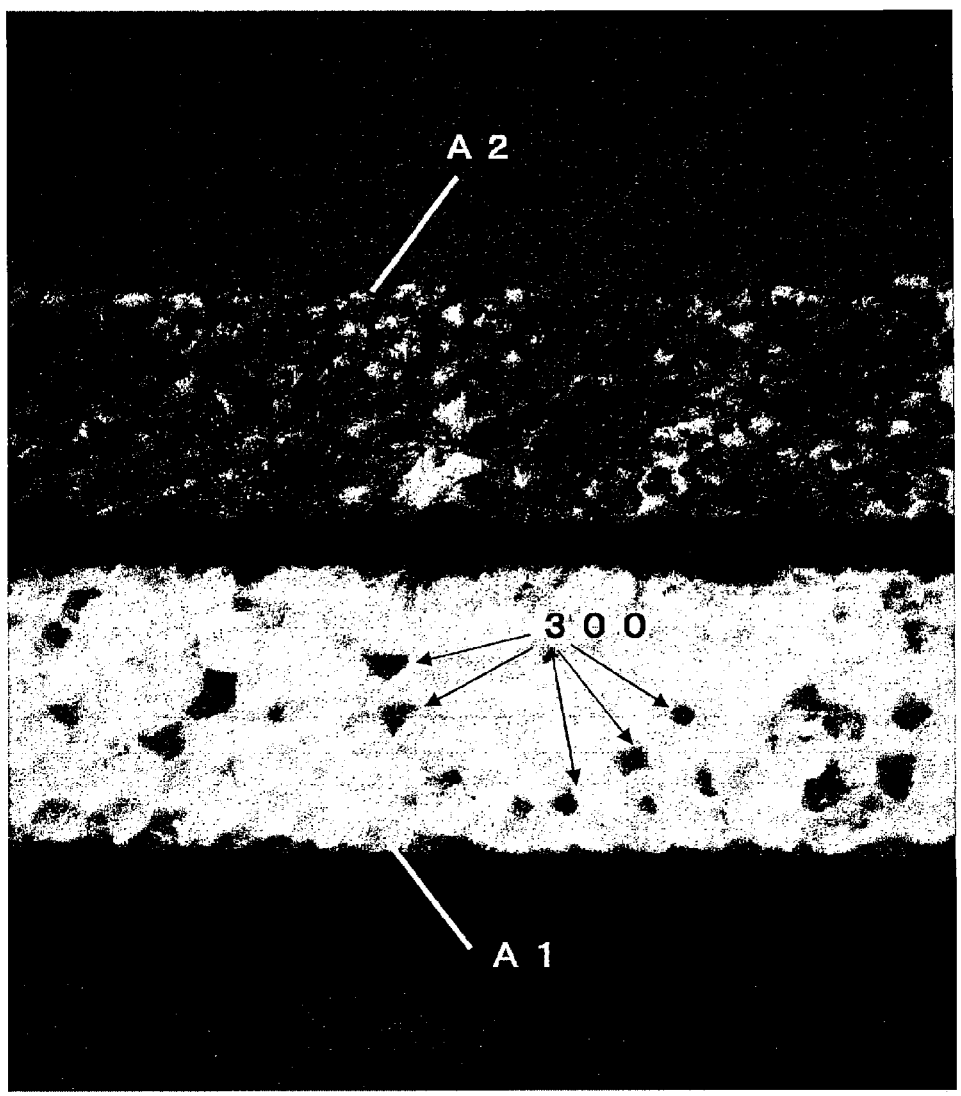
FIG. 8 is a figure (photo) showing the state in which the fiber-reinforced resin material is peeled from the resin composite.

The photo is shown in FIG. 8.

Here, it was clarified by observation of the photo that, in this resin composite, the lump 300 formed by resin flowing into the inner area of the resin expanded particles forming the interface with the FRP layer A2.

Also, the proportion of resin expanded particles in which the resin had flowed into of the resin composite shown in FIG. 8 was about 25%.

Also, the resin composite shown in FIG. 8 showed superior adhesion between the resin expanded body and the fiber-reinforced resin material.

From also that above, it is understood that, in accordance with the present invention, a resin composite having superior adhesion between the resin expanded body and the fiber-reinforced resin material can be obtained.

EXPLANATION OF SYMBOLS

200: Resin expanded particle
300: Lump
A: Resin composite
A1: Core material (resin expanded body)
A2: Fiber-reinforced resin layer (fiber-reinforced resin material)

What is claimed is:

1. A resin composite, comprising:
    a fiber-reinforced resin material comprising fibers and a resin; and
    a resin expanded body integrally laminated with said fiber-reinforced resin material, wherein
    said resin expanded body comprises a plurality of resin expanded particles integrated by direct thermal fusion,
    at least one of said plurality of resin expanded particles is arranged at said interface between said resin expanded body and said fiber-reinforced resin material, said at least one resin expanded particle includes a first hole provided through the surface skin of said at least one resin expanded particle, a lump of the resin penetrates through the first hole and into an inner area of said at least one resin expanded particle,
    said resin expanded body has a second hole opened at an interface between said resin expanded body and said fiber-reinforced resin material,
    said fiber-reinforced resin material and said resin expanded body are integrally laminated via a portion of said resin of said fiber-reinforced resin material that flowed into the second hole,
    a void section is provided between said resin expanded particles,
    the second hole comprising an opening in said void section provided at a surface of said resin expanded body that is disposed at said interface of said resin expanded body and said fiber-reinforced resin material,
    wherein a core material of said resin expanded body comprises polyester, and the apparent density of said core material is 0.9 to 1.2 g/cm$^3$.

2. The resin composite according to claim 1, wherein said portion of said resin flowed into an inner area of said resin expanded particles.

3. The resin composite according to claim 1, wherein
    said void section penetrates from a first surface having said opening to a second surface, which is a surface opposite to said first surface, and said void section is also open in said second surface,
    said fiber-reinforced resin material is laminated on both said first surface and said second surface, and
    said fiber-reinforced resin material is continuously integrated by said portion of said resin that flowed into said void section.

4. The resin composite according to claim 1, wherein a proportion of said void section occupying said resin expanded body is 0.1 to 50% by volume.

5. The resin composite according to claim 1, wherein said void section is arranged between adjacent surface skins of said plurality of resin expanded particles.

* * * * *